United States Patent
Vergnot et al.

(10) Patent No.: US 11,198,498 B2
(45) Date of Patent: Dec. 14, 2021

(54) OPENING SYSTEM AND METHOD FOR AN AIRCRAFT EMERGENCY DOOR

(71) Applicant: LATECOERE, Toulouse (FR)

(72) Inventors: Patrick Vergnot, Toulouse (FR); Christian Romec, Saint Loup Cammas (FR)

(73) Assignee: Latecoere, Toulouse (FR)

(*) Notice: Subject to any disclaimer, the term of this patent is extended or adjusted under 35 U.S.C. 154(b) by 719 days.

(21) Appl. No.: 15/764,065

(22) PCT Filed: Sep. 29, 2016

(86) PCT No.: PCT/IB2016/055837
§ 371 (c)(1),
(2) Date: Mar. 28, 2018

(87) PCT Pub. No.: WO2017/056036
PCT Pub. Date: Apr. 6, 2017

(65) Prior Publication Data
US 2018/0273156 A1    Sep. 27, 2018

(30) Foreign Application Priority Data
Oct. 2, 2015 (FR) ...................... 1559413

(51) Int. Cl.
*B64C 1/14*          (2006.01)

(52) U.S. Cl.
CPC ............ *B64C 1/143* (2013.01); *B64C 1/1461* (2013.01); *E05Y 2201/62* (2013.01); *E05Y 2201/626* (2013.01)

(58) Field of Classification Search
CPC ..... B64C 1/143; B64C 1/1461; B64C 1/1423; B64C 1/14; B64C 1/1407; E05Y 2201/62; E05Y 2201/626
(Continued)

(56) References Cited

U.S. PATENT DOCUMENTS 4,720,065 A * 1/1988 Hamatani ............. B64C 1/1407
                                                    244/129.5
5,064,147 A * 11/1991 Noble ..................... B64C 1/143
                                                    244/129.5
(Continued)

FOREIGN PATENT DOCUMENTS

EP    0741073    11/1996
EP    0876954    11/1998
(Continued)

OTHER PUBLICATIONS

Seidl M. et: "Ionization energy and electron affinity of a metal cluster in the stanilized jellium model: Size Effect and Charging limit", Journal of Chemical Physiscs, American Institute of Physics, US vol. 108, No. 19, Jul. 16, 1997, pp. 8182-8289, XP000694625.

*Primary Examiner* — Timothy D Collins
*Assistant Examiner* — Tye William Abell
(74) *Attorney, Agent, or Firm* — Defillo & Associates; Evelyn A. Defillo

(57) ABSTRACT

The invention proposes a simple system, with small space requirement, without hinge arms or sealing skirt, while providing secure and effective opening. To achieve this, the invention provides a door opening by a lateral guidance defining an integrated doubling-back kinematics, towards the interior then the exterior of the fuselage. An opening system of an emergency door (1) is positioned in an aircraft fuselage (2), the door and the fuselage comprising respective frameworks (11, 21) extending opposite each other. According to the invention, the system comprises a control handle (5) for rotating, combined with a bolt/latch pair, and an opening mechanism (30) equipped, in the upper corner areas (Zs) of the door (1), with a pivoting lever (6) hinged on an upper edge of the fuselage (2) and provided with guide tracks interacting with the bulk/latch pair and with a door attachment fitting (12), upper and lower rollers mounted in (Continued)

the lateral framework of the door (11*c*) in connection with the guide tracks (20*s*, 20*i*) mounted in the opposing fuselage framework (21*c*), the upper guide tracks (20*s*) being inclined rising towards the interior of the cabin (I) and the lower guide tracks (20*i*) being curved.

15 Claims, 6 Drawing Sheets

(58) Field of Classification Search
   USPC .................................................. 244/129.5
   See application file for complete search history.

(56) References Cited

U.S. PATENT DOCUMENTS

| | | | | |
|---|---|---|---|---|
| 5,305,969 | A * | 4/1994 | Odell | B64C 1/1407 244/129.5 |
| 5,687,452 | A * | 11/1997 | Hamatani | E05D 3/127 16/82 |
| 5,931,415 | A * | 8/1999 | Lingard | B64C 1/143 244/129.5 |
| 11,077,937 | B1 * | 8/2021 | Bruell | B64C 11/001 |
| 2003/0089827 | A1 * | 5/2003 | Baderspach | B64C 1/1407 244/137.2 |
| 2015/0014483 | A1 * | 1/2015 | Minchau | B64C 1/1423 244/129.5 |

FOREIGN PATENT DOCUMENTS

| | | | |
|---|---|---|---|
| FR | 2830564 | 4/2003 | |
| FR | 3018064 A1 * | 1/2013 | |
| FR | 3018064 A1 * | 1/2014 | ............. B64C 1/143 |
| FR | 3018064 | 9/2015 | |
| WO | WO2013128219 | 9/2013 | |

* cited by examiner

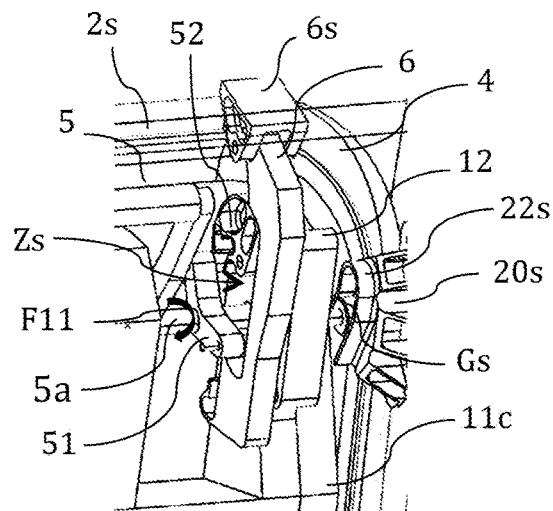
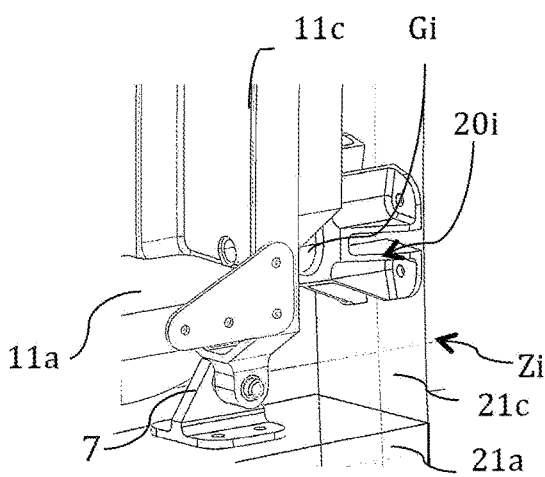
FIGURE 3a
FIGURE 3b
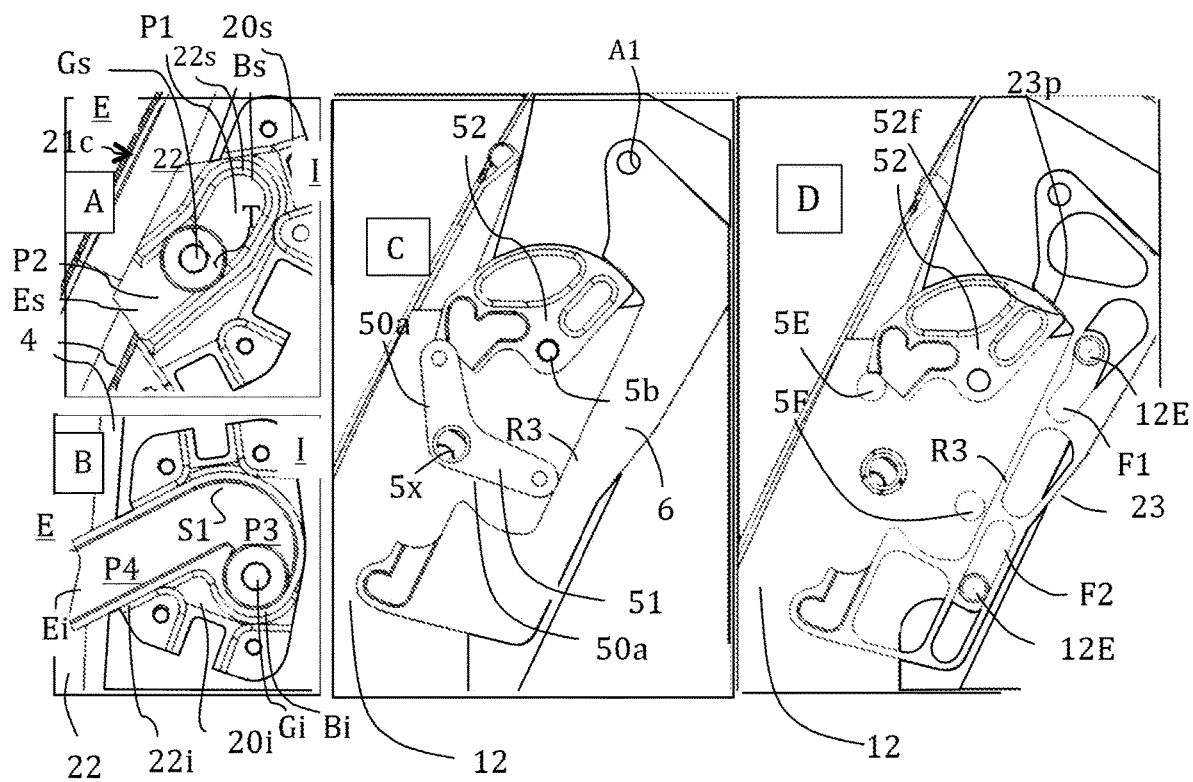
FIGURE 4a

OPENING SYSTEM AND METHOD FOR AN AIRCRAFT EMERGENCY DOOR

CROSS REFERENCE TO RELATED APPLICATION

This application is a national stage entry of PCT/162016/055837 filed Sep. 29, 2016, under the International Convention claiming priority over French Patent Application No. 1559413 filed Oct. 2, 2015.

TECHNICAL FIELD

The invention relates to a method for opening an emergency door of an aircraft, as well as to a system comprising a mechanism between the emergency door and the fuselage of an aircraft which can implement a method of this type. An emergency door of an aircraft is situated above the wing unit of the aircraft (overwing emergency exit door). Apart from their function of evacuation of the passengers in an emergency situation, doors of this type can be used to receive/unload equipment or goods.

In general, the opening of an aircraft door, for example a passenger door or an emergency door, can be broken down into a plurality of movements which follow one another, i.e. unlocking and release of a safety catch, and lifting and pivoting of the door by means of actuators around an axis of rotation. For the closure, these movements follow one another in accordance with inverse kinematics.

In emergency situations, the objective is to be able to trigger the opening of the door with a minimum number of operations in a minimum amount of time, whilst making the opening secure.

PRIOR ART

Safety regulations are becoming increasingly restrictive, giving rise to putting into place of complex kinematics, with means which have significant disadvantages, in particular articulation arms which are cumbersome, costly and have substantial masses, as well as sealing skirts because of additional cut-outs in the fuselage in order to create the clearance for the door upwards or downwards.

An aircraft emergency door is known for example from patent document EP 0 876 954 which is equipped with two arms which are secured on a door panel, and are fitted such as to be articulated on the fuselage situated above the door, in order to raise the door into the upper position. Whilst being articulated on the fuselage, the arms are also driven by guide means on assembly panels which are integral with the door panel.

In order to accompany the movement of the door, actuators are fitted on the fuselage in the upper part of the door, in order to exert a thrust on the articulation arms. A damper is also present in a similar position, in order to regulate the speed of displacement of the door. In addition, in order to keep the joining between the interior and exterior of the aircraft sealed, it is necessary to provide a sealing skirt on the periphery of the door, which abuts against the fuselage.

The assemblies for guiding of the articulation arms and guiding of the door frame define typical door opening kinematics, i.e. at the start of lifting, the upper and lower edges of the door are displaced both towards the interior of the fuselage and upwards.

In general, the cabin doors use sealing skirts for their joining with the fuselage, with the skirt being able to have a flexible flap which is placed on the exterior of the fuselage, after having been pre-compressed in the direction of the fuselage, as described in patent FR 2 975 966. The phases of opening and closure of the door then require suitable kinematics for the correct positioning of the flap.

Other solutions, for example in patent documents FR 2 830 564 or EP 0741 073 include the use of a pneumatic or hydraulic actuator of the jack type, in association with a motor fluid supply reserve. This type of solution remains cumbersome, and generates a substantial weight, in particular because of the motor fluid reserve.

SUMMARY OF THE INVENTION

The objective of the invention is to eliminate these disadvantages of the prior art by means of a system which is not cumbersome, and is without an articulation arm or sealing skirt, without requiring complex kinematics, whilst creating a safe and efficient opening. In addition, the non-cumbersome mechanism according to the present invention will make it possible to comply with the requirement of aircraft companies concerning the possibility of integration in the emergency door of a window with a size comparable with that of the other windows of the cabin.

For this purpose, the invention provides a door opening by means of lateral guiding defining integrated doubling-back kinematics towards the interior of the cabin for the upper edge of the door, then towards the exterior of the fuselage for the lower edge, before proceeding with lifting by means of rotation.

In this respect, the subject of the present invention is a method for opening an aircraft cabin emergency door in a fuselage in order to permit emergency exit of passengers from the cabin. The method consists of providing opening kinematics for a door arranged in a cut-out in the fuselage, from an initial door state in the closed position, with a profile aligned with the fuselage, according to the following succession of steps, generated in succession by the action of an opening control: a step of activation of intermediary movement units in order to unlock and unblock a control transmission, a step of inclined lifting in association with the fuselage, by means of inclined sliding of the upper edges of the door towards the interior of the cabin, and simultaneous lifting and sliding of its lower edge. This step is followed, by means of doubling-back of movement, by a step of exteriorization of the lower edge of the door outside the cabin, by sliding of the edges of the door in the inverse direction, and according to inclination which is substantially the same as that of the upper edge in the lifting step, thus repositioning the upper edge of the door simultaneously at the fuselage, and a final step of pivoting of the door by means of locking and blocking of the control transmission on the door, which is then pivoted, via the opening control, around a longitudinal axis of rotation of the fuselage. In addition, the slidings are created by upper and lower connection guides between frameworks of the door and of the fuselage opposite, as well as by guides for cooperation of the control transmission with the door.

In these conditions, the to-and-fro displacements of the door occupy a minimalized space without an additional cut-out in the fuselage, which makes it possible to reduce significantly the size of the door cut-out in the fuselage, and to dispense with the skirt-type sealing systems for the door-fuselage connection.

According to preferred embodiments:

the step of activation of the intermediary movement units on the control transmission starts with a phase of unlocking caused by combined rotation of the intermediary movement units from a locking-blocking position, this unlocking giving rise to unblocking of the guides for cooperation of the transmission control with the door and of the guides for connection between the frameworks;

the intermediary movement units comprise a first and a second intermediary movement unit, respectively for locking-unlocking and for blocking-unblocking, with the first intermediary unit having a locking function which can be released from the second unit, and the second unit having a function of blocking the access to movement, which is released when the first intermediary unit has been disarmed, these intermediary units having longitudinal axes of rotation supported by the door, at a distance which is designed to allow their combined rotation;

the step of inclined lifting of the door is generated by simultaneous trajectories towards the interior of the cabin of the upper connection guides, and upwards of the lower connection guides, starting from an intermediary position on the upper guides, and from a position of low abutment on the lower connection guides, as far as a high abutment position on these connection guides defining the doubling-back, whereas sliding of the door takes place simultaneously upwards in the cooperation guide of the control transmission as far as a high abutment position;

in the step of exteriorization of the door, the upper and lower connection guides follow, in the inverse direction and as far as their disconnection, inclination trajectories which are smaller than, or equal to, the inclination of the trajectories of the upper connection guides in the lifting step, and, simultaneously, the door slides downwards on the cooperation guide from the high position, until it reaches a low abutment, then, at the end of sliding, the cooperation guide of the door is locked-blocked by the intermediary movement units in the position of locking abutment on the control transmission cooperation guide, corresponding to the initial position of pivoting; at the end of the phase of exteriorization, the lower edge of the door is cleared sufficiently towards the exterior of the aircraft relative to the fuselage such that the pivoting phase starts without risk of contact;

the final step of pivoting of the door starts by driving of the locked-blocked door on the control transmission by the opening control around the axis of rotation of the control transmission, until a predetermined end position is reached;

compensation for the mass of the door is provided in order to balance this mass during the final lifting step.

The invention also relates to an emergency opening system for a door positioned in an aircraft fuselage, comprising respective door and fuselage frameworks which extend opposite at least one bolt/latch pair, a door attachment fitting, and upper and lower guide tracks fitted in the framework of the fuselage.

The opening system also comprises a handle for combined rotation of at least the (un)locking/(un)blocking bolt/latch pair, and an opening mechanism, which is equipped in at least one upper corner area of the door with a pivoting lever which is articulated in rotation on an upper edge of the fuselage, and is provided with tracks for guiding in cooperation with the bolt/latch pair and with the door attachment fitting, with upper and lower guide rollers fitted in the lateral framework of the door in order to form means for guiding in association with the corresponding guide tracks fitted in the fuselage framework opposite, with the upper guide tracks being globally inclined in a rising manner, and the lower guide tracks being curved. In addition, each upper guide track has two substantially linear consecutive slide portions in which there circulate respectively the rollers obtained from the corresponding door framework lateral beam, and each lower guide track has a curved configuration with a top.

Preferably, the upper guide tracks have a high end inner stop and portions which are substantially linear and inclined as far as a low outer end opening, and the lower guide tracks have a low inner end stop which is coupled with a substantially vertical portion provided with a top and extended by a substantially linear portion with an end which is open towards the exterior according to inclination with a gradient smaller than that of the portions of the upper guide tracks.

According to particularly advantageous embodiments:

the bolt has two end lugs, i.e. a lug which can circulate in guide tracks integrated in the latch, and a lug which can slide on a ramp portion with a configuration which ends in a locking stop, with the latch having a face which can cooperate with a connected wall of the ramp of the pivoting lever;

the (each) pivoting lever has a guide track in cooperation with lugs obtained from the door attachment fitting, with this guide track having rims which act as a ramp for the bolt and the latch;

the door framework has lateral sides which are integral with, or which incorporate, the door attachment fittings;

a spring for compensation of the mass of the door is fitted on the axis of rotation of the pivoting lever, in order to balance the mass of the door during the pivoting;

auxiliary stops are secured at the corner of joining of the lateral beams and of the door framework longitudinal beam, and at the fuselage framework longitudinal beam opposite, in order to prevent rupture of the upper guide track.

The invention also relates to an aircraft cabin emergency door in a fuselage comprising an opening system as defined above.

In the present text, the term "roller" designates both a rolling part which is mobile in rotation during its displacement on a ramp or in a cam track, slide, channel or the equivalent, and a non-rotary finger which is displaced in translation. "Vertical" or "horizontal" qualifies a direction parallel to the direction of terrestrial gravity or respectively on a plane perpendicular to this direction. The terms "upper" and "lower" refer to a location respectively above and below the window of the door. The term "longitudinal" refers to the main direction of the aircraft fuselage, "front" and "rear" refer to the usual terms for location in aircraft, i.e. on the cockpit side and the tail side of an aircraft. "Transverse" qualifies an extent on a plane perpendicular to the longitudinal direction of the fuselage, and "lateral" qualifies an extent in the fuselage in a direction perpendicular to the longitudinal direction. In addition, "high" or "low" ends or stops respectively refer to a highest relative position or lowest relative position in a single element, in the sense of the furthest from, or the closest to, the ground. The terms "rising" or "descending" signify displacement upwards, i.e. moving away from the ground, or respectively downwards and approaching it. In addition, "exterior" or "external" (or respectively "interior" or "internal") qualifies a location situated on the exterior (or respectively in the interior) of the aircraft cabin, in other words outside (or respectively inside) the aircraft fuselage.

BRIEF DESCRIPTION OF THE FIGURES

Other details, characteristics and advantages of the present invention will become apparent from reading the following non-limiting description, provided with reference to the appended figures, which represent respectively:

FIGS. 3a and 3b are enlargements in perspective of an example of a door opening system according to the invention, as localized in partial views on lateral beams of the framework of the door and of the fuselage opposite;

FIGS. 4a to 4f are views in cross-section on transverse planes of the connection guides (diagrams A and B), and of the cooperation guides (diagrams C and D) of this opening system implemented from the locking state as far as the maximum opening of the door, between instants of locking/blocking (FIG. 4a), unlocking (FIG. 4b), unblocking (FIG. 4c), lifting as far as the point of doubling-back (FIG. 4d), at the end of exteriorization (FIG. 4e), and in the process of pivoting (FIG. 4f);

DETAILED DESCRIPTION OF THE INVENTION

In the figures, identical reference signs refer to the same element, as well as to the corresponding passages of the description.

The diagrams in FIGS. 1a to 1d illustrate an aircraft emergency door profile 1 which is displaced in position relative to the profile of the fixed fuselage 2 of an aircraft, in order to illustrate the essential steps of the kinematics of doubling-back opening according to the invention.

Figures 1A, 1B, 1C, 1D:
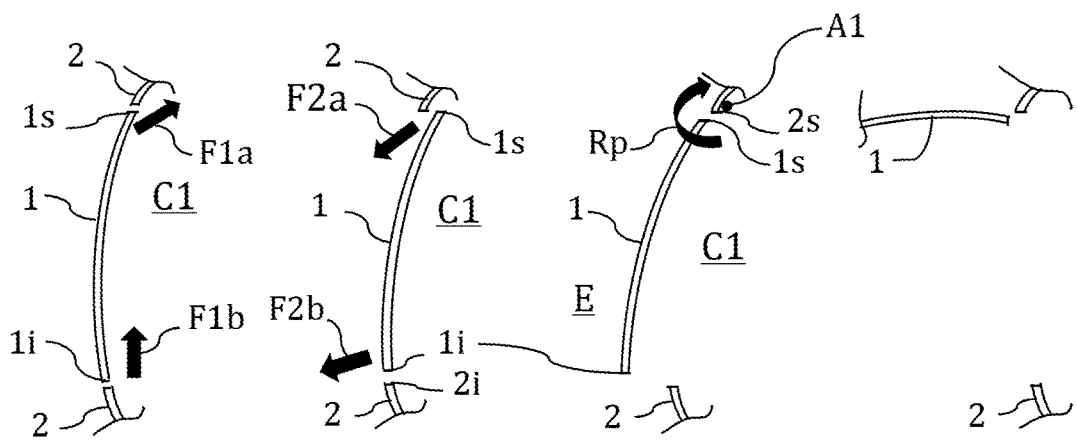
FIGS. 1a to 1d are profile diagrams of an aircraft emergency door relative to the profile of the fuselage, illustrating the essential steps of the kinematics of doubling-back opening according to the invention.

In the diagram in FIG. 1a, the door 1 is in the closed position, and the door profile 1 is then substantially aligned in the continuity of the fuselage profile 2 which surrounds it. The arrow F1a for the upper door edge 1s, and the arrow F1b for its lower edge 1i, indicate the direction and orientation which the first, so-called inclined lifting step will impart on the door 1. In this inclined lifting step, the upper edge of the door 1s is displaced towards the interior of the cabin C1 (arrow F1a), whereas the lower edge 1i is displaced substantially vertically upwards (arrows F1b).

FIG. 1b illustrates the position of the door 1 relative to the fuselage 2, further to the displacement carried out during the lifting step, with the edge 1s in the cabin C1, and the edge 1i elevated opposite the lower edge 2i of the fuselage 2. By means of doubling-back of movement, the step of exteriorization which follows consists of translating the door 1 according to an inclination which is substantially identical to that of the lifting step, but in the inverse direction (arrows F2a and F2b). This step of exteriorization prepares the lower edge 1i in the position outside the cabin C1, in order to proceed to the final pivoting in secure conditions.

In fact, at the end of the step of exteriorization (FIG. 1c), the lower edge 1i of the door 1 is cleared on the exterior of the cabin C1 in other words in the space "E" outside the aircraft whereas the upper edge 1s has returned to the upper edge of the fuselage 2s.

The pivoting of the door 1 (pivoting step) can then commence by rotation (arrow Rp) around an axis of pivoting A1 positioned in the vicinity of the upper edge 2s of the fuselage 2. The pivoting step continues until the door 1 has reached a position of maximum opening relative to the profile of the fuselage 2, as illustrated in FIG. 1d.

Figures 2A, 2B:
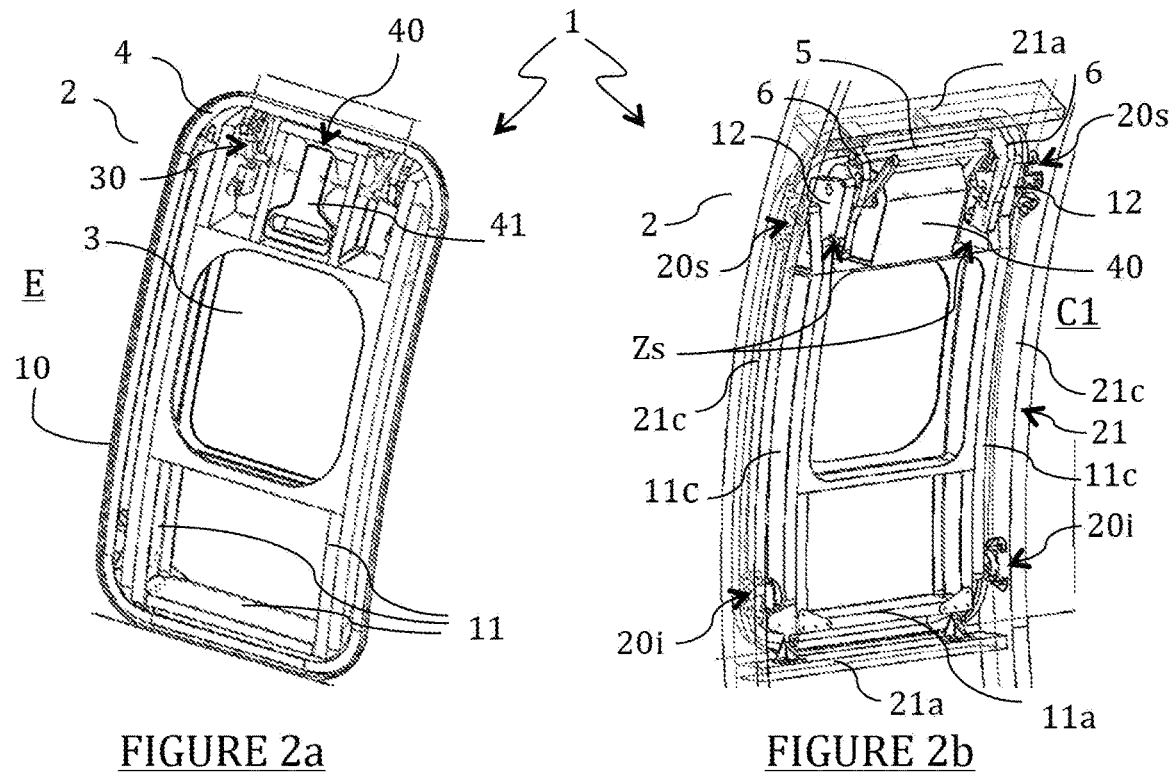
FIGS. 2a and 2b are views in perspective of the aircraft emergency door in the closed position, respectively from the exterior of the fuselage and from the interior of the aircraft cabin.

More realistically, the views in perspective in FIGS. 2a and 2b illustrate the aircraft emergency door 1 in the closed position, respectively from the exterior "E" of the fuselage 2 and from the interior of the cabin C1.

The emergency door 1 comprises a window 3, and is positioned in a cut-out 10 created in the fuselage 2. A seal 4 (which is also shown in FIGS. 3a and 4a to 4f), diagrams A and B) is secured on the border of the door 1, and runs along the cut-out 10 when the door is in the closed position. A sealed housing 40 accommodates an external opening control handle 41.

In the interior of the cabin C1, the edges of the door 1 and of the fuselage 2 which are arranged opposite one another around the cut-out 10 comprise respectively door framework and fuselage beams, respectively 11 and 21, which extend longitudinally and laterally, i.e.: two, upper and lower longitudinal beams 11a and 21a, as well as two, front and rear lateral beams, respectively 11c and 21c, which join the corresponding longitudinal beams.

The emergency door opening system 1 comprises an opening control handle 5 and a door opening mechanism 30. This mechanism 30 gives rise to the intervention of the pivoting levers 6 and lateral door attachment fittings 12 arranged in the upper corner areas Zs of the door, located at, or alternatively integrated in, the door lateral framework beams 11c.

In addition, upper and lower guide tracks 20s and 20i are fitted on the lateral beams 21c of the fuselage framework 21, in the vicinity of their upper and lower ends, and opposite the lateral beams 11c of the door framework 11.

FIGS. 3a and 3b illustrate enlargements of the opening system according to partial views in perspective, located respectively in the upper and lower corner areas Zs and Zi of the lateral beam 11c of the door framework 11, opposite the lateral beam 21c of the fuselage 2.

With reference to FIG. 3a, the control handle 5 rotates (arrow F11) the shaft 5a which in turn drives the locking/unlocking bolt 51 in combination with the blocking/unblocking latch 52.

These bolt 51 and latch 52 elements, also known as "intermediary movement units", cooperate with the pivoting lever 6, which is articulated in rotation by means of a support 6s secured on the upper edge 2s of the fuselage 2, in order to act on the door attachment fitting 12 (cf. FIGS. 4a to 4f). An upper connection guide, in the upper corner areas Zs, is provided for an upper roller Gs obtained from the door attachment fitting 12 (or alternatively from the door framework lateral beam 11c which acts as an attachment fitting), and slides in the upper guide track 20s fitted in the fuselage framework lateral beam 21c.

With reference to FIG. 3b, a lower connection guide is provided in the lower corner areas Zi, between the door 11c and fuselage 21c lateral beams, by a lower roller Gi which is obtained from the door lateral beam 11c, in order to slide in the lower guide track 20i fitted in the fuselage lateral beam 21c opposite.

In addition, a lower auxiliary stop 7 is secured on the joining corner of the lateral beams 11c and the door framework longitudinal beam 11a, and on the fuselage framework longitudinal beam 21a opposite. This lower auxiliary stop 7 makes it possible to prevent the rupture of the corresponding lower guide track 20i. An equivalent function is ensured in the upper location of the door 1 by the pivoting lever 6, in order to prevent rupture of the upper guide track 20s (cf. FIG. 2b).

Figure 4B:
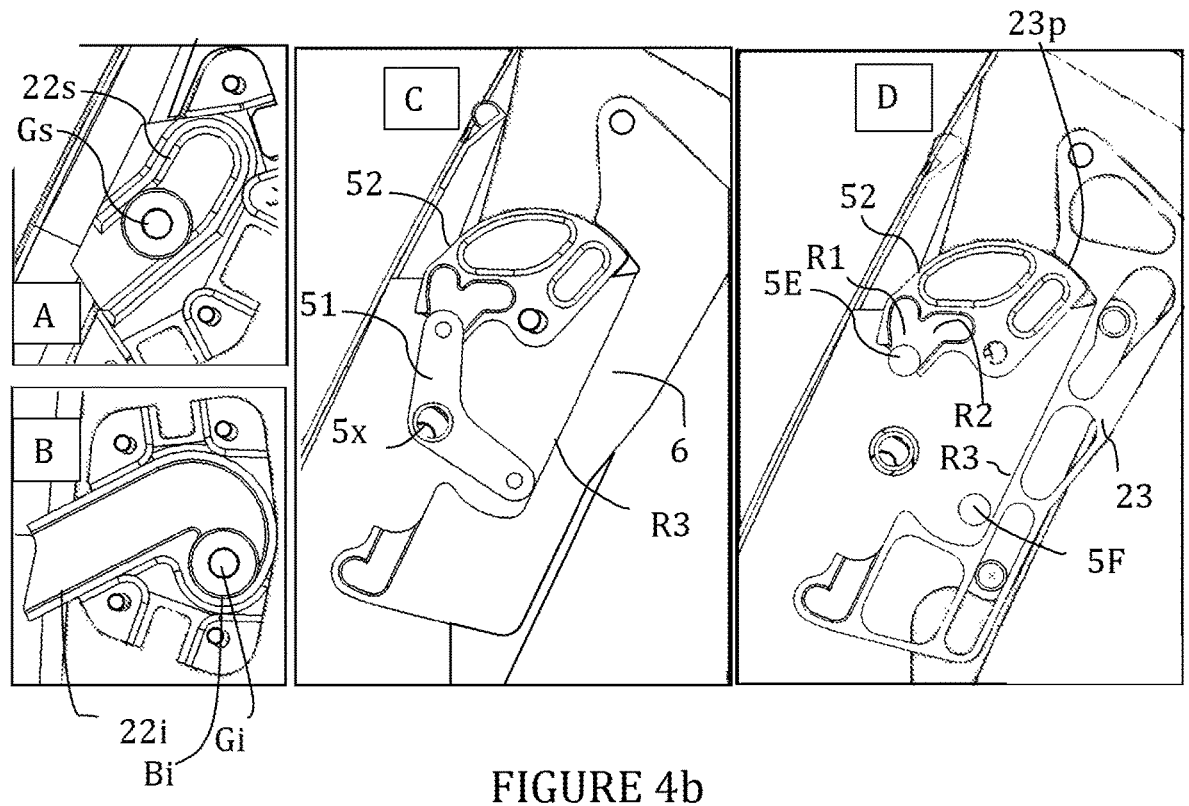
Figure 4C:
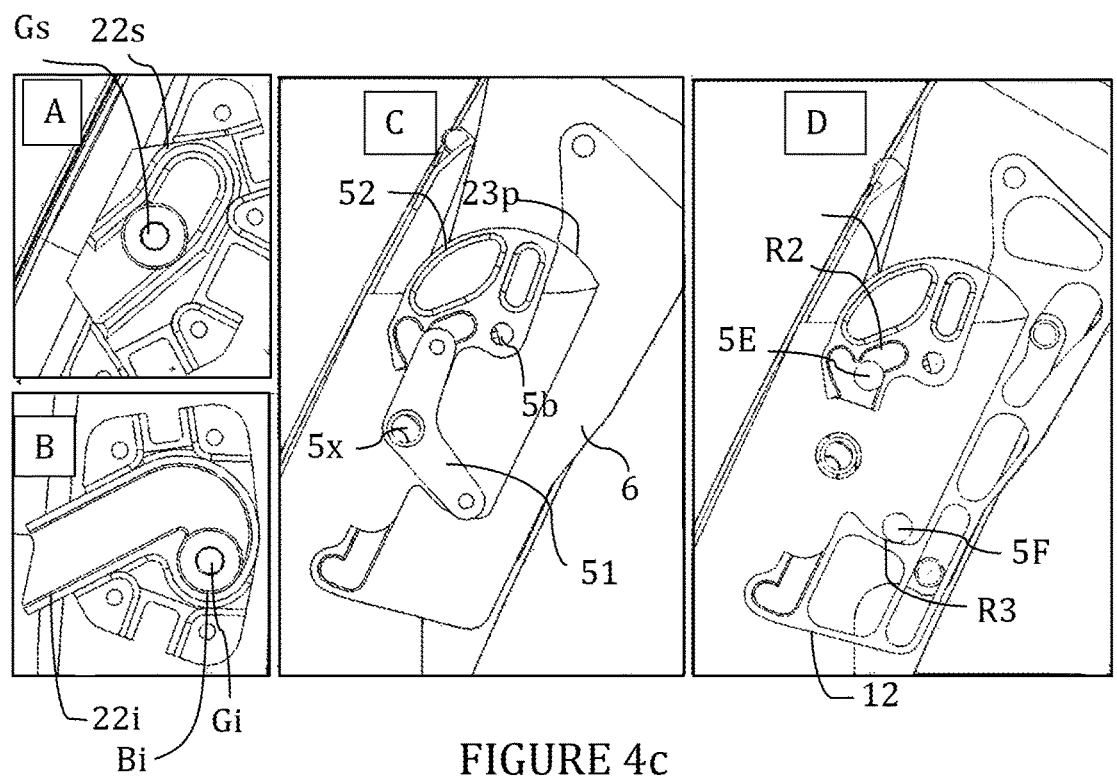
Figure 4D:
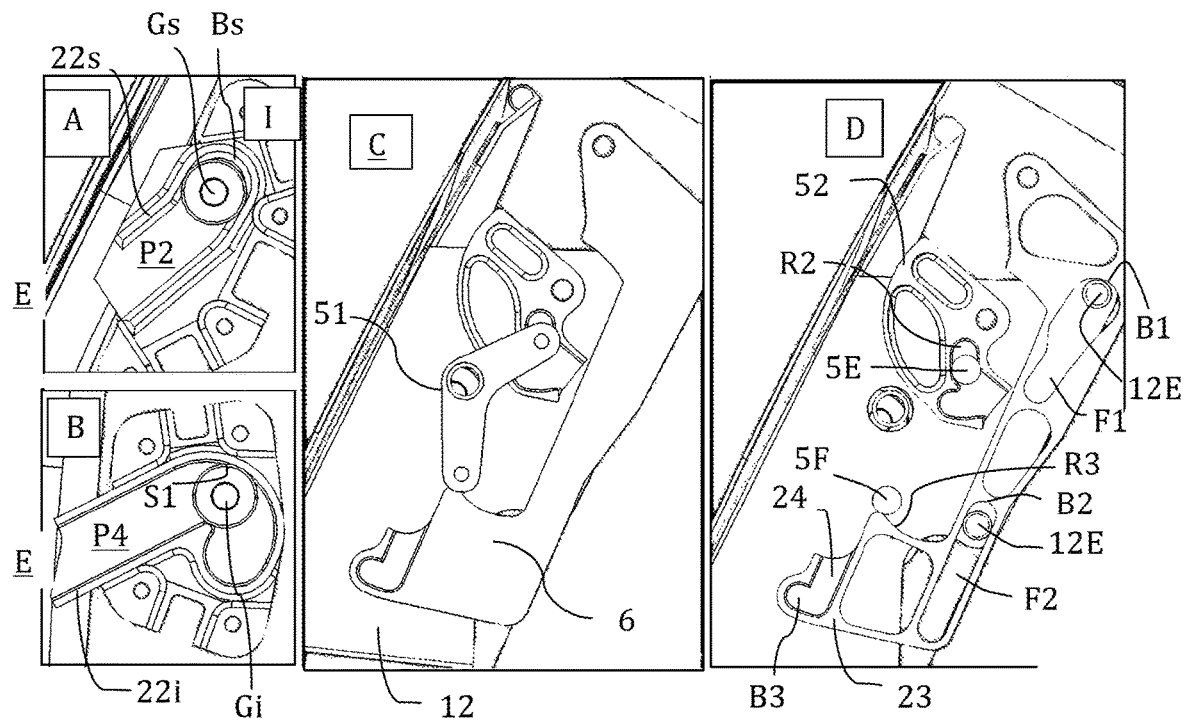
Figure 4E:
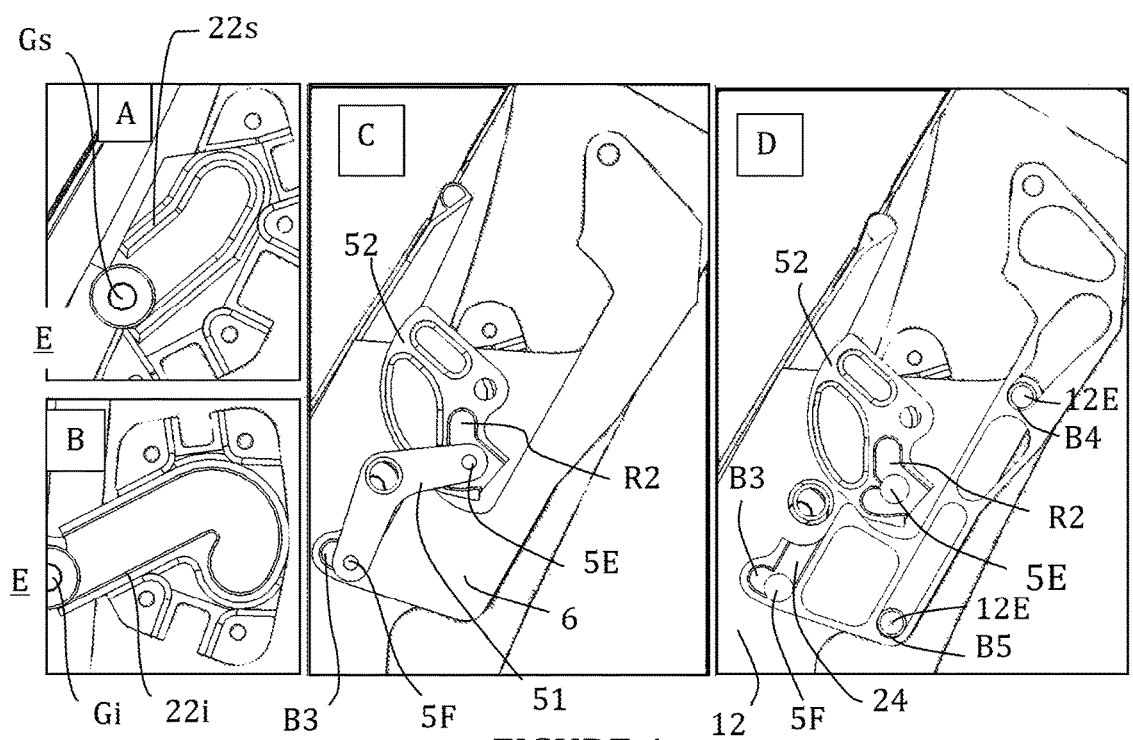
Figure 4F:
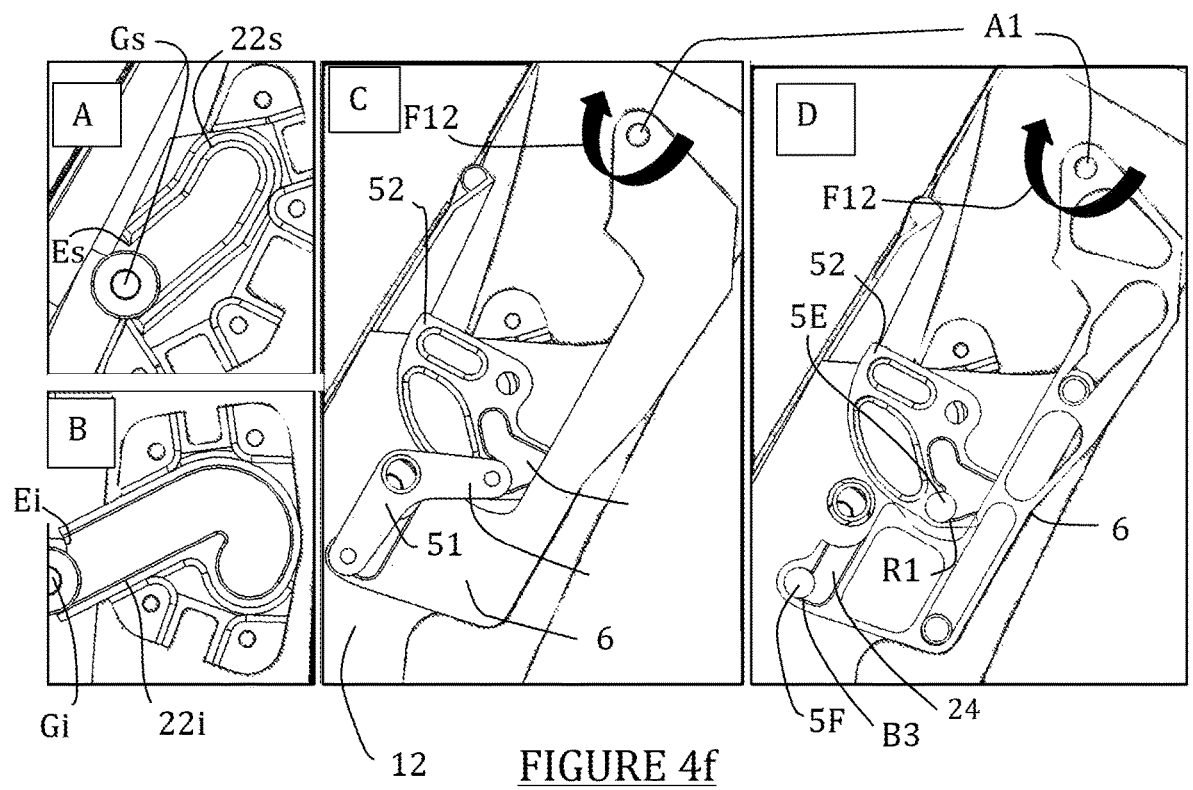

The emergency door opening system is now described in detail by means of the cross-sectional views in FIGS. 4a to 4f, on transverse planes of the connection guides (diagrams A and B) and of the cooperation guides (diagrams C and D). More specifically, these views illustrate the opening system from the locking as far as the maximum opening of the door, at the instants of locking/blocking (FIG. 4a), unlocking (FIG. 4b), unblocking (FIG. 4c), at the point of doubling-back (FIG. 4d), at the end of exteriorization (FIG. 4e), and at the end of opening (FIG. 4f).

With reference to the diagrams A and B in FIGS. 4a to 4c, with the door 1 remaining in the closed position and the opening mechanism locked and blocked (cf. the preceding figures), the rollers Gs are halfway along each slide 22s of the upper connection guide track 20s, i.e. at a transition line "T". The rollers Gi are also simultaneously at low abutment Bi of each slide 22i of the lower connection guide track 20i.

More specifically, each upper guide track 20s (diagram A), fitted on a transverse face 22 of a fuselage framework lateral beam 21c, has a slide 22s formed by two linear portions P1 and P2, which succeed one another around the transition line "T". The portions P1 and P2 have inclination gradients with the same sign and a slightly different amplitude: the portion P1 which is situated towards the interior "I" of the cabin has a gradient which is inclined more, relative to a horizontal line, than that of the portion P2 which is situated towards the exterior "E" of the fuselage 2. The difference in the amplitude of inclination between the portions P1 and P2 depends on the fuselage configurations, with these portions being able to have the same inclination. The portion P1 ends towards the interior in a high stop Bs, and the portion P2 ends in an opening Es towards the exterior "E".

In addition, each slide 22i (diagram B) of the lower guide tracks 20i, also fitted on the transverse face 22, has a curved configuration with, from the interior "I" towards the exterior "E", a substantially vertical portion P3 starting from the inner low stop Bi, a top S1 which forms a high stop, and an inclined linear portion P4 which ends in an opening Ei towards the exterior "E". This portion P4 has a gradient with an inclination with a slightly smaller amplitude (relative to a horizontal line) than that of the portion P2 of the upper slide 22s.

Diagrams C and D of FIG. 4a show the bolt 51 and the latch 52 which have as axes of rotation, supported by the door attachment fitting 12, respectively the axis 5x of the longitudinal shaft 5a driven by the control handle 5 (cf. FIG. 3a), and an axis 5b parallel to the axis 5x.

The lock 51 has two wings 50a which end in two lugs 5E and 5F. The lug 5E is blocked against the latch 52, and the lug 5F is in the vicinity of the "vertical" portion of a ramp R3 in the form of an "L" formed by the pivoting lever 6, which incorporates a cooperation guide track 23 (diagram D). A face 52f of the latch 52 is blocked against a wall 23p connected to the ramp R3. Thus, the bolt 51 and the latch 52 are in the position of immobilization (locking/blocking) of the door attachment fitting 12: lugs 12E of said fitting 12 are blocked halfway along windows F1, F2 formed in the cooperation guide track 23 of the pivoting lever 6. These lugs 12E also remain in this position in diagrams C and D of FIGS. 4b and 4c, i.e. for as long as the opening mechanism is locked and/or blocked.

With reference to diagrams C and D in FIG. 4b, an action on the control handle 5 (cf. FIG. 3a) gives rise to unlocking without unblocking of the opening system. The bolt 51 has turned around its axis of rotation 5x, such that the lug 5E is in a position in which it can circulate in bearing tracks R1 and R2 which are integrated in the latch 52. The lug 5F of the bolt 51 remains in the vicinity of the "vertical" portion of the ramp R3 in the form of an "L". The latch 52 remains blocked against the connected wall 23p of the ramp R3 of the pivoting lever 6.

In FIG. 4c showing unblocking of the opening mechanism, the latch 52 is disengaged from the connected blocking wall 23p further to the rotation of the latch 52 in combination with that of the bolt 51, the distance between their axes 5x and 5b being determined in order to carry out this combined rotation. The lug 5E of the bolt 51 penetrates simultaneously into the bearing track R2 of the latch 52. The other lug 5F of the bolt 51 slides along the "horizontal" portion of the ramp R3 in the form of an "L" of the pivoting lever 6.

Further to the unblocking, the opening mechanism continues with the step of inclined lifting of the door via that of the attachment fitting 12. FIG. 4d illustrates the end of this step of lifting towards the interior of the cabin as far as the point of doubling-back. The upper roller Gs slides in the inclined portion towards the interior "I" of the linear portion P1 (cf. diagram A of FIG. 4a) of the slide 22s until it reaches the high stop Bs (diagram A). Simultaneously, the lower roller Gi reaches the top S1 of the lower slide 22i (diagram B).

The positions of the rollers Gs and Gi in the slides 22s and 22i correspond to a position of the lug 5F of the bolt 51 at the end of sliding on the small side of the ramp R3 of the pivoting lever 6 (diagram C). With the door attachment fitting 12 having followed the lifting of the door, the lugs 12E of this attachment fitting 12 reach or approach the high stops B1 and B2 of the windows F1 and F2 of the cooperation track 23 (diagram D) of the pivoting lever 6. The opening mechanism has reached its point of doubling-back, corresponding to the position of the roller Gs against the high stop Bs.

In fact, the step of exteriorization of the door then takes place by sliding in the inverse direction of the roller Gs, and thus doubling-back, whereas the roller Gi continues its "curved" movement around the top S1, respectively in the inclined portions P2 and P4 of the slides 22s and 22i, towards the exterior "E" (diagrams A and B). Simultaneously, the lug 5F of the bolt 51 moves towards a slide 24 of the pivoting lever 6 which ends in a locking stop B3 (diagrams C and D).

At the end of the step of exteriorization, the positions of the rollers Gs, Gi of the slides 22s and 22i and of the lugs 5E and 5F of the bolt 51 are as illustrated by FIG. 4e: the rollers Gs and Gi are at the end of sliding, inclined downwards, i.e. at the openings, almost disconnected from the slides 22s and 22i (diagrams A and B), and therefore ready to be released towards the exterior "E".

The lug of the bolt 5E exits from the bearing track R2 of the latch 52, and the lug of the bolt 5F is positioned in the vicinity of the locking stop B3 of the pivoting lever 6. With the door 1 (cf. FIG. 2b) and its attachment fitting 12 also having slid downwards, the lugs 12E (diagrams C and D) of this attachment fitting 12 are against the low stops B4 and B5 of the windows F1 and F2 of the pivoting lever 6.

After the step of externalization, the pivoting of the door 1 (cf. FIG. 2b) is ready to engage, once the door attachment fitting 12 is locked on the pivoting lever 6, as illustrated by FIG. 4f. At this instant, whilst the rollers Gs, Gi are still at the openings Es and Ei in the slides 22s and 22i (diagrams A and B), the lug 5F of the bolt 51 is immobilized in the locking stop B3, and its other lug 5E is blocked in abutment on the bearing track R1 of the latch 52 (diagrams C and D):

the attachment fitting 12 is rendered integral with the pivoting lever 6 by this locking/blocking of the intermediary movement units, with the bolt 51 combined with the latch 52.

Figure 5:
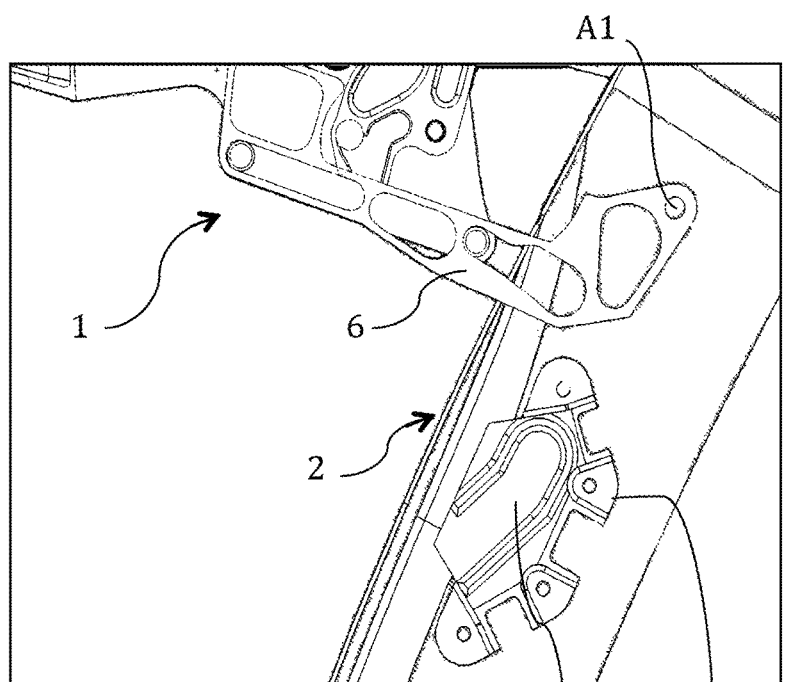
FIG. 5 is a partial view in cross-section of the door in the position of maximum lifting, on the transverse plane of the diagram D.

The pivoting lever 6 will then rotate the door attachment fitting 12 and thus the door 1 around the axis of pivoting A1 of the pivoting lever 6 (arrow F12). As illustrated by the view in partial cross-section in FIG. 5, situated on the transverse plane of the diagram D, the pivoting lever 6 opens the emergency door 1 as far as a maximum lifting position. The amplitude of the opening of the emergency door 1 can be appreciated with reference to the fuselage 2 and to the slide 22s of the upper connection guide track 20, which are also represented.

Figure 6:
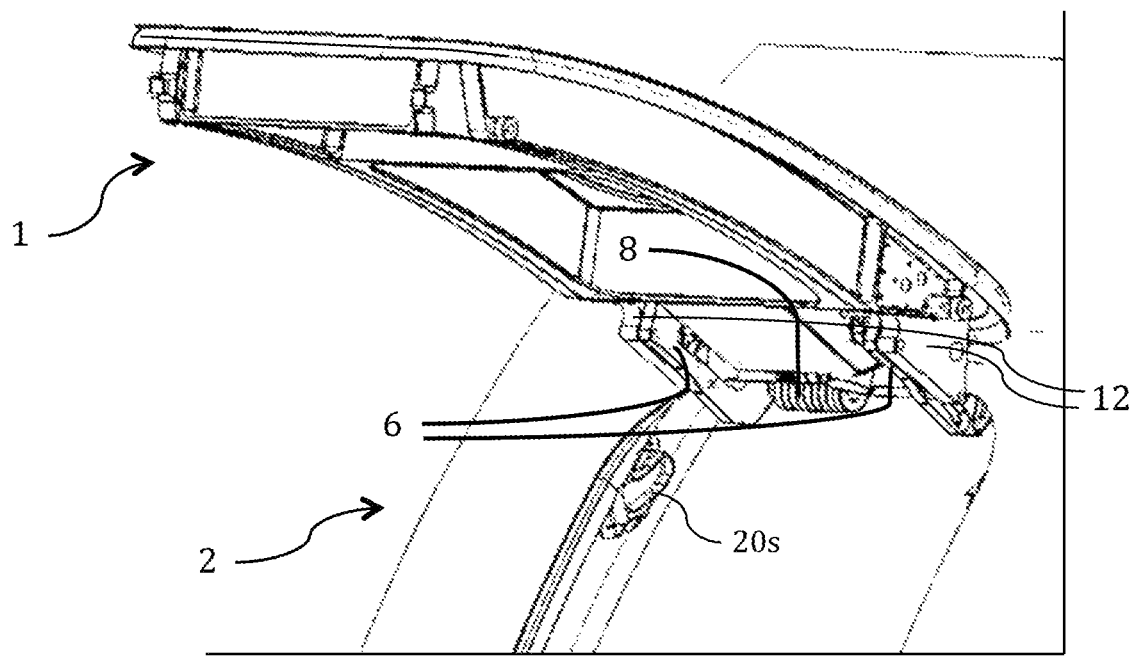
FIG. 6 is an external view in perspective of the emergency door in the maximum lifting position.

Starting from the view in perspective coming from the exterior "E", FIG. 6 also shows the emergency door 1 in the maximum opening position relative to the fuselage 2. This view also shows a compensation spring 8—which, by means of its compression, is designed to balance the mass of the door 1 when it is opened-, the door attachment fittings 12, the pivoting levers 6, and an upper guide track 20s for connection to the corresponding attachment fitting 12.

The invention is not limited to the embodiments described and represented. Thus, other configurations and numbers of connection guide tracks (between the lateral framework beams of the door and the fuselage) can be used. In addition, the number of intermediary movement units can be more than two. The gradients of the slides of the guide tracks are adapted according to the configuration of the fuselage or the door.

The invention claimed is:

1. A method for opening an aircraft cabin emergency door in a fuselage carrying out opening kinematics for a door arranged in a cut-out in the fuselage, from an initial door state in the closed position, with a profile aligned with the fuselage, according to the following succession of steps generated in succession by the action of an opening control comprising:
   activating intermediary movement units designed to allow combined rotation to unlock and unblock a control transmission;
   a step of inclined lifting thus generated in association with the fuselage, by inclined sliding of an upper edge of the door towards an interior of a cabin; and
   simultaneous lifting and sliding of a lower edge of the door, followed by doubling-back of movement, a step of exteriorization of the lower edge of the door outside the cabin, by inclined sliding of the upper and lower edges of the door in the inverse direction, and according to inclination which is the same as that of the upper edge in the lifting step, thus repositioning the upper edge of the door simultaneously at the fuselage, and a final step of pivoting of the door by locking and blocking of the control transmission on the door via the intermediary movement units, which is then pivoted around a longitudinal axis of rotation of the fuselage, with the slidings being created by upper and lower connection guides between frameworks of the door and of the fuselage opposite, as well as by guides for cooperation of the control transmission with the door.

2. The opening method as claimed in claim 1, wherein the step of activation of the intermediary movement units on the control transmission starts with a phase of unlocking caused by combined rotation of the intermediary movement units from a locking-blocking position, with the unlocking giving rise to unblocking of the guides for cooperation of the transmission control with the door and of the guides for connection between the frameworks.

3. The opening method as claimed in claim 1, wherein the intermediary movement units comprise a first and a second intermediary movement unit, respectively for locking-unlocking and for blocking-unblocking, the first intermediary unit having a locking function which releases from the second intermediary unit, and the second unit having a function of blocking the access to movement, which is released when the first intermediary unit has been disarmed, the intermediary units having longitudinal axes of rotation supported by the door, at a distance.

4. The opening method as claimed in claim 1, wherein the step of inclined lifting of the door is generated by simultaneous trajectories towards the interior of the cabin of the upper connection guides, and upwards of the lower connection guides, starting from an intermediary position on the upper guides, and from a position of low abutment on the lower connection guides, as far as a high abutment position on these connection guides defining the doubling-back, whereas sliding of the door takes place simultaneously in the cooperation guide of the control transmission as far as a high abutment position.

5. The opening method as claimed in claim 1, wherein, in the step of exteriorization of the door, the upper and lower connection guides follow, in the inverse direction and as far as their disconnection, inclination trajectories which are smaller than, or equal to, the inclination of the trajectories of the upper connection guides in the lifting step, and, simultaneously, the door slides downwards on the cooperation guide from the high position, until it reaches a low abutment, then, at the end of sliding, the cooperation guide of the door on the control transmission is locked-blocked by the intermediary movement units in the position of locking abutment, corresponding to the initial position of pivoting of the door.

6. The opening method as claimed in claim 1, wherein the step of pivoting of the door starts by driving of the locked-blocked door on the control transmission by the opening control around the axis of rotation of the control transmission, until a predetermined end position is reached.

7. The opening method as claimed in claim 1, wherein compensation for the mass of the door is provided in order to balance this mass during the final lifting step.

8. An emergency opening system for a door positioned in an aircraft fuselage, respective door and fuselage frameworks extending opposite the system comprising:
   at least one bolt/latch pair,
   a door attachment fitting,
   upper and lower guide tracks fitted in the framework of the fuselage, a control handle for combined rotation of at least the (un)locking/(un)blocking bolt/latch pair, and
   an opening mechanism, which is equipped in at least one upper corner area of the door with a pivoting lever which is articulated in rotation on an upper edge of the fuselage, and is provided with tracks for guiding in cooperation with the bolt/latch pair and with the door attachment fitting, with upper and lower rollers fitted in the lateral framework of the door in order to form means for guiding in association with the corresponding guide tracks fitted in the fuselage framework opposite, with the upper guide tracks being globally inclined in a rising manner towards the interior of the cabin, and the lower guide tracks being curved, and in that, each upper guide track has two substantially linear consecutive slide portions in which there circulate respectively the rollers obtained from the corresponding door framework lateral beam, and each lower guide track has a curved configuration with a top forming a high stop between two portions.

9. The opening system as claimed in claim 8, wherein the upper guide tracks have a high end inner stop and portions which are linear and inclined as far as a low outer end opening, and the lower guide tracks have a low inner end stop which is coupled with a substantially vertical portion provided with a top and extended by a substantially linear portion with an end which is open towards the exterior according to inclination with a gradient smaller than that of the portions of the upper guide tracks.

10. The opening system as claimed in claim 8, wherein the bolt has a first lug which circulates in guide tracks integrated in the latch, and a second lug which slides on a ramp portion with a configuration which ends in a locking stop, with the latch having a face which cooperates with a connected wall of the ramp of the pivoting lever.

11. The opening system as claimed in claim 8, wherein each pivoting lever has a guide track in cooperation with lugs obtained from the door attachment fitting, with this guide track having rims which act as a ramp for the bolt and the latch.

12. The opening system as claimed in claim 8, wherein the door framework has lateral sides which are integral with, or which incorporate, the door attachment fittings.

13. The opening system as claimed in claim 8, wherein a spring for compensation of the mass of the door is fitted on the axis of rotation of the pivoting lever, in order to balance the mass of the door during the pivoting.

14. The opening system as claimed in claim 8, wherein auxiliary stops are secured at the corner of joining of the lateral beams and of the door framework longitudinal beam, and at the fuselage framework longitudinal beam opposite.

15. An emergency door of an aircraft cabin in a fuselage, comprising an opening system as claimed in claim 8.

* * * * *